UNITED STATES PATENT OFFICE.

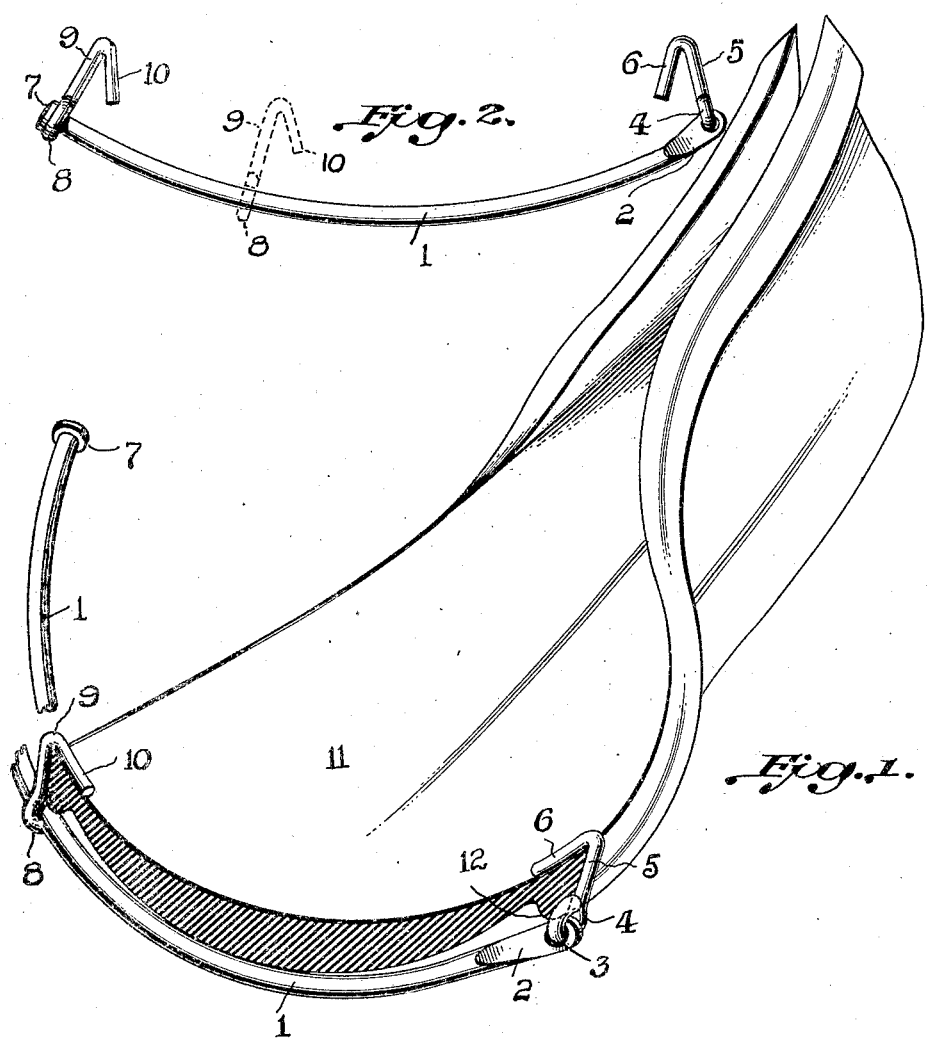

ARTHUR E. JOSLIN, OF PONTIAC, MICHIGAN.

TIRE-HOLDING DEVICE.

1,362,250.        Specification of Letters Patent.     Patented Dec. 14, 1920.

Application filed April 5, 1919. Serial No. 287,694.

*To all whom it may concern:*

Be it known that I, ARTHUR E. JOSLIN, a citizen of the United States of America, residing at Pontiac, in the county of Oakland and State of Michigan, have invented certain new and useful Improvements in Tire-Holding Devices, of which the following is a specification, reference being had therein to the accompanying drawings.

The primary object of my invention is to provide a simple, durable and inexpensive tool that may be advantageously employed for holding the outer casing of a tire in an open position so that easy access may be had to the inner wall of the tire casing or an inner tube in said casing, the tool being constructed to grip the side edges of the tire casing and hold said casing in an open position without any obstructions therein, thereby permitting repairs to be easily and quickly made.

Another object of my invention is to provide a tire holding tool that will facilitate the opening of a tire casing by providing sufficient leverage for tires of various sizes and types, and the tool is of such construction that it can be readily carried in a tool kit and expeditiously used for the purpose for which it is intended.

The above and other objects are attained by a mechanical construction that will be hereinafter specifically described and then claimed, and reference will now be had to the drawing, wherein—

Figure 1 is a perspective view of a portion of a tire casing, partly in section, and showing the tool in position for holding the tire casing open, with part of the tool broken away, and Fig. 2 is a side elevation of the tool.

The tool comprises a curved rod or lever, which has the outer end thereof somewhat flattened, as at 2, and provided with an aperture 3. Loose in the aperture 3 is the eye 4 of a hook shaped member 5 having an angularly disposed bill 6.

The inner end of the rod or lever 1 has a head 7 and slidable on said rod or lever is the eye 8 of a hook shaped member 9 having a bill 10, said hook shaped member being very similar to the member 5.

The reference numeral 11 denotes an outer tire casing having clencher or rim engaging edges 12. These casings are often very heavy and somewhat rigid due to their shape, and it is often a laborious task to open the casing so that an inner tube can be removed or repairs made on the inner wall of the casing.

To use my improved tool, the rod or lever 1 is extended under the casing 11 and the hook shaped member 5 placed in engagement with the clencher edge 12 thereof. The rod or lever 1 is then used as a lever and the outer casing as a fulcrum and as the inner end of said rod or lever is carried toward the ungripped clencher edge of the outer casing, the hook shaped member is placed in engagement with the edge of the casing, as shown in Fig. 1, so that the casing will be held wide open.

With the tool extending under and against the outer side of the tire casing, it is obvious that the inside thereof is clear of obstructions, consequently patching or any other repair operations can be carried on without any interference by the tool. This is in contradistinction to some tire holding tools that occupy spaces within the tire casing and materially interfere with repair work therein.

The outer casing shown in the drawing is of a conventional form having the usual clencher edges and the hook shaped members of my tool have been shown as shaped to conform to the casing edges, and it is to be understood that the hook shaped members may have bills of various contours so as to firmly grip the edges of any type of outer tire casing. It is obvious that with one of the hook shaped gripping members slidable on the rod or lever and said rod or lever of sufficient length, that various sizes of outer casings may be held by the tool, and by using two or more of the tools a large area on the inner wall of the casing may be bared.

What I claim is:—

A tool for gripping the clencher edges of an outer tire casing and holding the casing distended and opened so that easy access may be had to the inner wall thereof, comprising a gripping member adapted to fit on one of the clencher edges of the casing, a curved lever having its outer end pivotally connected to said gripping member so that said lever may be manipulated on the outer wall of said casing as a fulcrum point for distending one side of the casing without necessarily displacing said gripping member, and a gripping member slidable on said lever and adapted to grip the other clencher edge of the tire casing as the inner end of said lever is brought in proximity thereto.

In testimony whereof I affix my signature in the presence of two witnesses.

ARTHUR E. JOSLIN.

Witnesses:
 KARL H. BUTLER,
 ANNA M. DORR.